Patented Aug. 21, 1923.

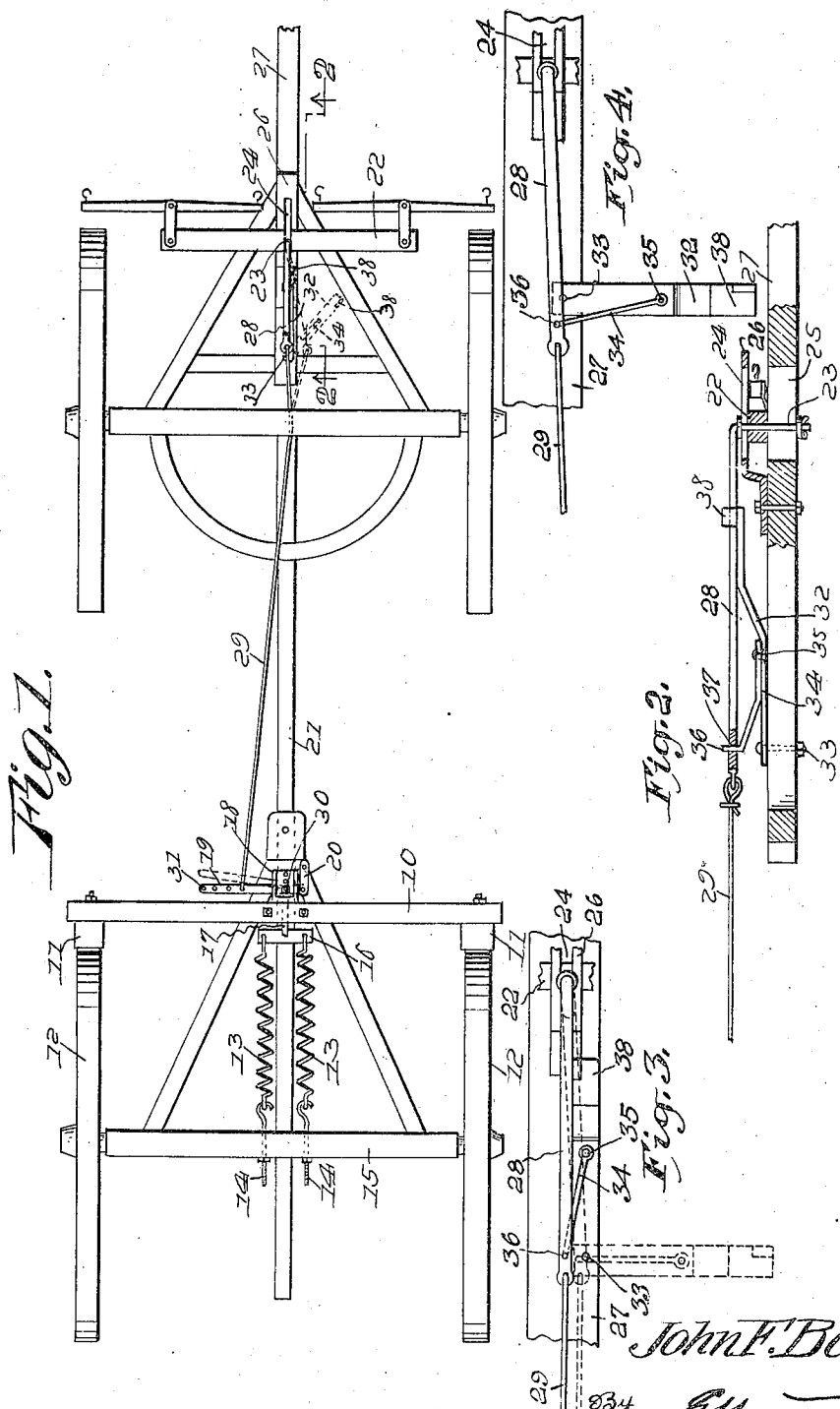

1,465,803

UNITED STATES PATENT OFFICE.

JOHN F. BOETTNER, OF WATSON, MISSOURI.

TEAM-OPERATED WAGON BRAKE.

Application filed April 23, 1921. Serial No. 463,924.

*To all whom it may concern:*

Be it known that I, JOHN F. BOETTNER, a citizen of the United States of America, residing at Watson, in the county of Atchison and State of Missouri, have invented new and useful Improvements in Team-Operated Wagon Brakes, of which the following is a specification.

The object of the invention is to provide a wagon braking mechanism for control by the draft team to the end that the brake shoes are withdrawn from contact with the wheels of the vehicle by forward strain applied to the draft appliances and are permitted to engage the wheels when the forward strain is relieved to resist or retard the forward movement of the vehicle in descending grades; and more especially to provide a simple, inexpensive and efficient mechanism for accomplishing the object indicated and which can be readily applied to vehicles now in use; and with these objects in view the invention consists in a construction and combination of parts of which a preferred embodiment is shown in the accompanying drawings, wherein:—

Figure 1 is a plan view of a brake mechanism embodying the invention.

Figure 2 is a longitudinal sectional view of the front portion of the same on the plane indicated by the line 2—2 of Figure 1.

Figure 3 is a detail plan view of the locking lever and related parts showing the former in dotted lines approaching its inactive or inoperative position as a lock.

Fig. 4 is a view similar to Figure 3 showing the locking lever in released position.

The brake beam 10 which carries the shoes 11 for engagement with the wheels 12 is yieldingly held in its braking position by spring action represented in the construction illustrated by the twin coiled springs 13 attached at their rear ends through adjustable bolts 14 to a cross bar 15 of the vehicle frame, such as the rear axle as shown, to the end that any desired tension may be applied to said spring elements by the adjustment of said bolts, and connected at their front ends to a rocker 16 consisting of a bar pivoted at an intermediate point to a clevis 17 extended through the brake beam and serving as a means of attachment thereto of a plate 18 to which is pivotally connected a lever 19 fulcrumed by means of a link 20 upon the reach bar 21 or other convenient portion of the vehicle running gear.

The doubel-tree 22 which carries the bolt 23 operating in registering slots 24 and 25 respectively in the clip 26 and tongue 27, is designed to impart longitudinal movement to the extension 28 of the bolt which constitutes a draw bar connected by a cable 29 with the lever 19, so that when a strain tending to advance the vehicle is applied to the double-tree the forward movement thereof limited by the slots in the clip and tongue serves to advance the brake beam to release the wheels of the vehicle of the pressure of the brake shoes, to the end that under normal conditions the vehicle is free to move forward unimpeded by the brake mechanism. Upon the reduction of draft strain upon the double-tree, however, the rearward movement of the brake beam is effected by the contraction of the spring elements 13 which may be of any desired number and tension, to apply braking pressure to the wheels to retard or resist the forward movement of the vehicle as in descending grades or when it is desired to check the forward movement as in stopping the vehicle. The pivot bolt 30 by which the lever 19 is connected to the plate 18 is adapted for engagement selectively with a series of openings in said plate to facilitate the application of the apparatus to different vehicles having the frame members arranged in different relations, and the lever 19 is provided with a plurality of openings 31 for selective engagement by the rear end of the cable 29 to vary the leverage of the draft upon the brake beam to suit the weight of the vehicle or the load or other conditions to be encountered in the use of the device.

In order to provide for the backing of the vehicle when required without imposing an unnecessary effort upon the team as would be produced by the frictional contact of the brake shoes against the wheel tires, it is preferable to employ in connection with the mechanism above described a means for locking the brake mechanism in an inoperative position and with the brake shoes removed from the wheels. To this end there is mounted upon the tongue 27 or other convenient portion of the vehicle frame a shifting lever 32 fulcrummed as at 33 by means of a bolt or the equivalent thereof and carrying at an intermediate portion of its length a clip 34 pivoted as at 35 to the lever and having a terminal pin 36 in engagement with an opening 37 in the draw bar 28, said lever being adapted for horizontal swinging movement to bring a terminal stop ear 38 into contact with the side edge of the draw bar in which position the rearward strain applied to said bar by reason of the cable 29 and incident to the tension of the springs 13 will serve to lock the lever against accidental displacement while the latter holds the said springs under tension with the brake beam 10 advanced sufficiently to entirely relieve the vehicle wheels of pressure. The arrangement of the pivotal bolt 33 at one side of the line of draft applied by the springs through the pivotal connection 35 of the clip with the lever constitutes an eccentric lock.

In the operation of the invention, the brake is arranged to normally effect braking action on the rear wheels 12, except when a draft strain is applied to the tongue 27 when the beam 10 is drawn forwardly to relieve the brake shoes 11 from contact with the wheels. Upon the release of the strain due to the movement of the vehicle, the springs 13 are free to act to effect braking action of the shoes 11 on the wheels 12. To permit free movement of the brake beam to effect braking and release movement, the shifting lever 32 must be swung outwardly to release position, as shown in Figure 4, when longitudinal movement of the draw bar 28 is permitted. To dispose the brake beam 10 in inoperative position where it will not move the shoes 11 toward the wheels 12, as when it is not desired to employ the braking mechanism, the lever 32 is swung into a position of parallelism with the draw bar 28 when the stop ear 38 contacts with the latter, when tension will be applied to the cable 29 to shift the brakebeam forwardly away from the wheels 12. As long as the lever remains in the position with its stop ear 38 in contact with the draw bar 28, the cable remains under tension whether there is a pull on the tongue or not and the springs 13 are precluded from moving the brake beam to effect braking action.

Having described the invention what I claim as new and useful is:—

1. A team operated brake mechanism having a spring actuated brake beam yieldingly held in brake applying position, a draw bar movable longitudinally of the vehicle and having draft appliances connected therewith, connections between the draw bar and the brake beam for moving the latter in opposition to the tension of its actuating spring, and locking means for securing the draw bar with the brake beam in an inoperative position and consisting of a lever having connection at an intermediate portion of its length with the draw bar and held in adjusted position by the tension of the brake applying spring.

2. A team operated brake mechanism having a spring actuated brake beam yieldingly held in brake applying position, a draw bar 28 movable longitudinally of the vehicle and having draft appliances connected therewith, connections between the draw bar and the brake beam for moving the latter in opposition to the tension of its actuating spring, and locking means for securing the draw bar with the brake beam in an inoperative position and consisting of a lever mounted for swinging movement in a plane parallel with the draw bar and provided at an intermediate portion of its length with a pivotal clip having engagement with the draw bar, said lever being eccentrically pivoted for movement into locking position when actuated to move the draw bar in opposition to the tension of the brake actuating spring.

3. A team operated brake mechanism having a spring actuated brake beam yieldingly held in brake applying position, a draw bar movable longitudinally of the vehicle and having draft appliances connected therewith, connections between the draw bar and the brake beam for moving the latter in opposition to the tension of its actuating spring, and locking means for securing the draw bar with the brake beam in an inoperative position and consisting of a lever eccentrically pivoted at one end and provided at the free end with a stop ear for engagement with the draw bar, a clip pivotally mounted upon the lever intermediate of the ends thereof and having a pin for engaging an opening in the draw bar to move the latter in opposition to the tension of the brake beam actuating spring.

In testimony whereof he affixes his signature.

JOHN F. BOETTNER.